Aug. 25, 1925.
J. A. LANDIS
TILTABLE HEADLIGHT
Filed Nov. 7, 1923
1,550,969
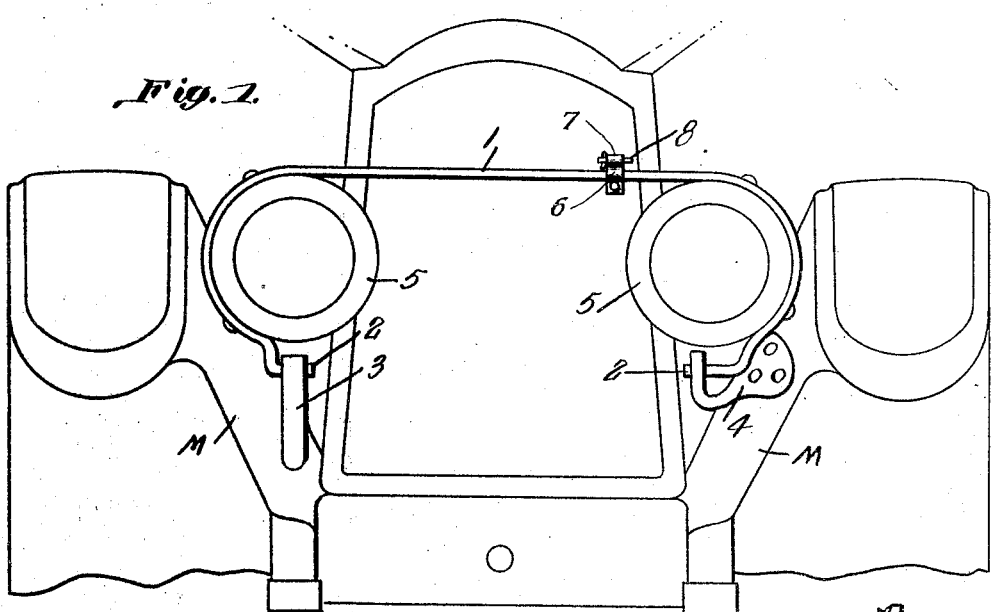
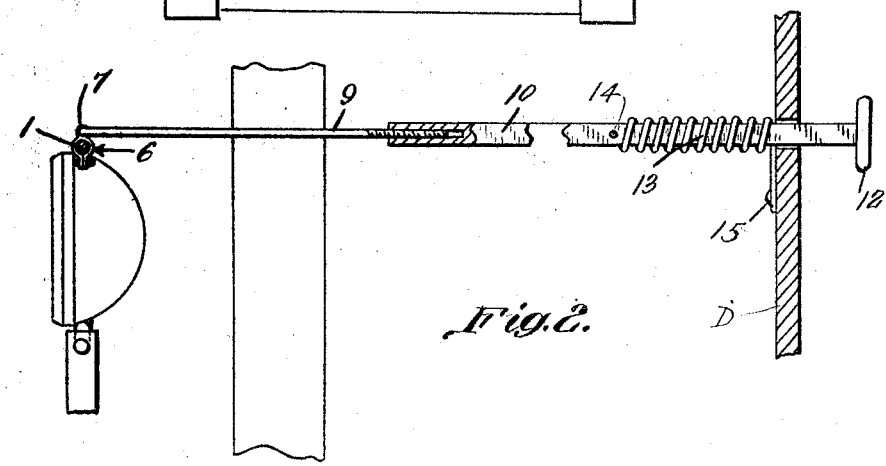
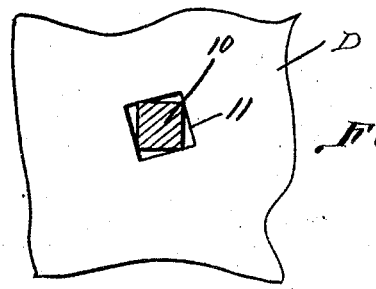
Jesse A. Landis, Inventor Patented Aug. 25, 1925.

1,550,969

UNITED STATES PATENT OFFICE.

JESSE A. LANDIS, OF EATON, OHIO.

TILTABLE HEADLIGHT.

Application filed November 7, 1923. Serial No. 673,300.

*To all whom it may concern:*

Be it known that I, JESSE A. LANDIS, a citizen of the United States, residing at Eaton, in the county of Preble and State of Ohio, have invented a new and useful Tiltable Headlight, of which the following is a specification.

This invention relates to tiltable headlights for automobiles, one of the objects thereof being to provide simple means under the control of the driver whereby the lights can be tilted to any desired angle relative to the surface of the ground.

A further object is to provide novel and efficient means for holding the light in any position to which it may be moved.

A still further object is to provide a structure of this character which can be installed readily on an automobile.

With the foregoing and other objects in view which will appear as the description proceeds, the invention resides in the combination and arrangement of parts and in the details of construction hereinafter described and claimed, it being understood that changes in the precise embodiment of the invention herein disclosed may be made within the scope of what is claimed without departing from the spirit of the invention.

In the accompanying drawings the preferred form of the invention has been shown.

In said drawings

Figure 1 is a front elevation of a portion of an automobile having the present improvements combined therewith.

Fig. 2 is a vertical longitudinal section through the tiltable headlight mechanism, parts being broken away.

Fig. 3 is an enlarged section on line 3—3, Fig. 2.

Referring to the figures by characters of reference 1 designates a cross rod the ends of which are curved downwardly and inwardly and are offset at their terminals to provide bearing fingers 2. These fingers are mounted for rotation within suitable supports 3 and 4 secured to and extending inwardly from the mud guards M of the vehicle. These supports 3 and 4 can be of either or both forms shown. The housings of the headlights 5 are seated within and secured to the downwardly curved portions of the rod 1 and are supported solely thereby so that when the rod is swung about the fingers 2 as a center the headlights will be tilted.

Secured to the rod 1 at a point between the housings of the headlights is a clamp 6 having a bearing eye 7 in which is seated the laterally extending terminal 8 of a rod 9. One end of this rod is screwed into a bar 10 preferably rectangular in cross section and slidably and tiltably mounted within a preferably rectangular opening 11 formed in the dash D of the vehicle. A knob or any other suitable device indicated at 12 is provided at one end of the bar 10 where it can be grasped readily by the driver. A coiled spring 13 is mounted on the bar and one end thereof is secured to the bar as shown at 14 while the other end is secured to the dash as shown at 15. This spring is constantly under tension with the result that the corner portions of the bar are normally pressed against the respective walls of the angular opening 11 as shown in Fig. 3. Consequently the bar is held frictionally against sliding movement and the lamp housings are thus supported at any desired angle. Should it be desirable to tilt the housing 5 the operator grasps the knob 12 and rotates it against the action of the spring 13 so as to shift the corner portions of bar 10 out of engagement with the walls of opening 11. Bar 10 should then be moved longitudinally in either direction until the lamp housings have been brought to the desired angle whereupon the rod is released and spring 13 will promptly bind the corner portions thereof against the walls of opening 11 and will be held against further movement.

As the spring 13 is a light one it will expand and contract readily when the bar 10 is shifted longitudinally.

What is claimed is:—

1. The combination with a movable structure and a structure having an angular opening, of means for shifting the movable structure, said means including an operating bar connected to the movable structure and angular in cross section, said bar being slidable within the opening, and a spring connection between the slidable bar and the apertured structure for holding the corner portions of the bar normally pressed frictionally against the walls of the opening to hold the movable structure against movement.

2. The combination with a movable headlight and a structure having an angular opening, of an angular bar mounted to slide and tilt within the opening and adjustably connected to the headlight, and a spring mounted on the bar for holding the bar normally positioned with its corner portions in frictional engagement with the walls of the opening.

In testimony that I claim the foregoing as my own, I have hereto affixed my signature.

JESSE A. LANDIS.